Figure 1:
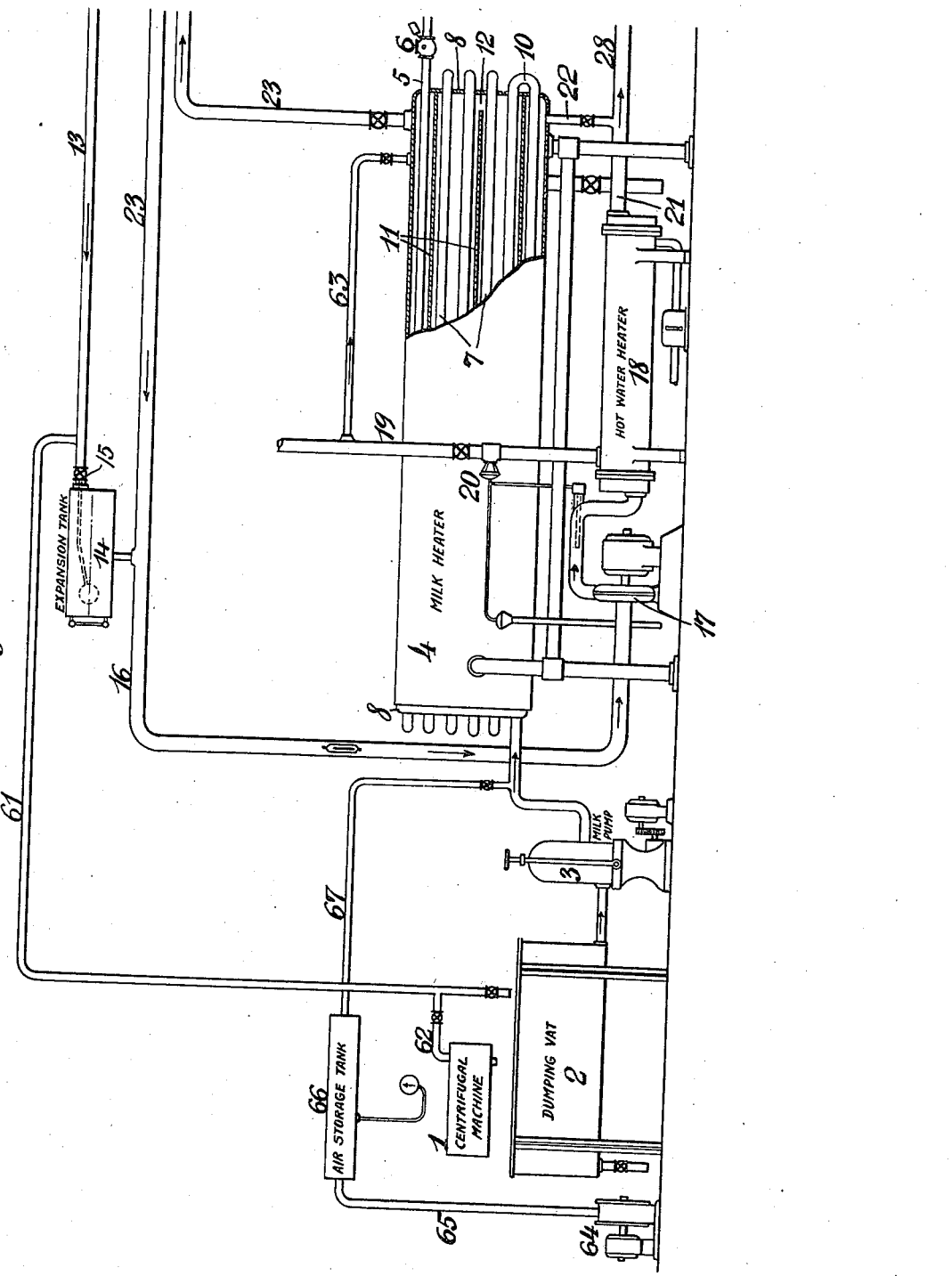

J. F. LESTER.
PROCESS OF PASTEURIZING MILK.
APPLICATION FILED AUG. 2, 1912.

1,141,566.

Patented June 1, 1915.
3 SHEETS—SHEET 2.

Fig. 2

Witnesses:
G. E. Rasmussen
John A. Ferguson

Inventor
James F. Lester
By his Attorneys
Briesen & Knauth

J. F. LESTER.
PROCESS OF PASTEURIZING MILK.
APPLICATION FILED AUG. 2, 1912.

1,141,566.

Patented June 1, 1915.
3 SHEETS—SHEET 3.

Witnesses:
G. V. Rasmussen
John A. Ferguson

Inventor
James F. Lester
By his Attorneys
Bresent Knauth

UNITED STATES PATENT OFFICE.

JAMES F. LESTER, OF NEW YORK, N. Y., ASSIGNOR TO RICHARD MERRIFIELD, OF NEW YORK, N. Y.

PROCESS OF PASTEURIZING MILK.

1,141,566. Specification of Letters Patent. Patented June 1, 1915.

Application filed August 2, 1912. Serial No. 712,841.

*To all whom it may concern:*

Be it known that I, JAMES F. LESTER, a citizen of the United States, and a resident of the borough of Manhattan, city, county, and State of New York, have invented a new and useful Process of Pasteurizing Milk, of which the following is a specification.

My invention relates to the pasteurization or sterilization of liquids intended for human consumption. In the following description, I will set forth my process as applied to the pasteurization of milk, but it will be understood that it is equally applicable to the pasteurization of other liquids, my invention being of such scope as to include any liquid, the pasteurization of which is desirable or necessary.

Prior to my invention milk was usually pasteurized by heating it to a temperature too high for proper pasteurization for a time insufficient for such pasteurization, and then retaining it in a holding tank until pasteurization was complete. The milk was then drawn from the holding tank, cooled and bottled. The principal defect in such processes is that, after being cooled to a temperature below that required for pasteurization, the milk often became infected by contact with imperfectly cleansed pipes and tanks, the impure air of the filling room, the hands of workmen, non-sterile bottles or other sources of infection. Though regarded as sterilized milk, it is obvious that when delivered to the consumer it was frequently far from being sterile. Such processes are objectionable also because in their operation the milk is often changed chemically or otherwise injured because of being heated to a destructively high temperature. They were further found to be imperfect and objectionable in that they failed to remove dirt and deleterious foreign matter generally from the milk. In some cases, the milk was strained through non-sterilized cotton before being heated, but this crude method of filtration is obviously inefficient in that only the larger particles of dirt are removed, a part of the milk is absorbed and wasted and, especially if a cloth of fine mesh is used, the valuable butter-fat constituents of the milk are retained thereby.

The novel process of my invention obviates all of the above objectionable features and in addition possesses inherent advantages not heretofore had, such as ease and speed of operation, absolute purity and sterility of product, unimpaired richness of product, uniformity of cream line and absence of losses due to waste and injury to the milk.

According to the process of my invention the milk is first strained in the cold state through a cloth and under pressure, such as that of centrifugal force. This operation may be dispensed with though I have found it valuable in most cases because such straining separates the coarser particles of dirt from the milk while at the same time, the butter-fats passing freely through the cloth, the quality of the milk is in no wise impaired. The milk is then quickly heated, preferably under pressure and to a pasteurizing temperature, by which I mean a temperature which is high enough to accomplish pasteurization but is not so high as to injure the quality of the milk in any way, a temperature which I have found should be about 145° F., but preferably not higher than 145° F. The heated milk is then filtered, preferably under pressure, through a bed of non-absorbent material, the temperature being maintained at approximately 145° F. during the filtering operation. By such filtration all of the dirt and other solid foreign matter is removed. The filtration has also been found to remove a considerable percentage of the bacteria in the milk. The butter-fat constituents of the milk, however, pass through the filter bed together with the more liquid portions of the milk. Thus a thorough purification of the milk, so far as dirt and solid particles generally is concerned, is attained while at the same time no loss in quality is suffered. After the hot filtration, the milk, still maintained at the pasteurizing temperature of about 145° F. is introduced into containers, such as the ordinary milk bottles of commerce, which have previously been sterilized and dried and are at the time of the filling operation at the same temperature as that of the milk, this equality of temperatures assuring the successful filling of the bottles without breakage.

The bottled milk is now in a sterile condition and may at once be delivered to the consumer. Inasmuch, however, as the above steps of heating, filtering and filling may be carried out in a relatively short period of time, and as in some States, the maintaining of the milk at a pasteurizing temperature for a relatively long period of time, as for instance from twenty to thirty minutes, is required by law, I subject the bottled milk to a further temperature treatment. Before the temperature of the milk and the bottle containing it has lowered appreciably below 145° F. the bottle preferably previously sealed with a fluid-tight cap, is subjected to contact with water at 145° F. for the required period of time, after which the milk is quickly cooled by subjecting the bottle to contact with water at gradually lower temperatures until a refrigerating temperature is reached. The milk is now absolutely sterile and is in condition for delivery to the consumer; moreover it is so packaged as to be absolutely free from contaminating influences until such time as the sealing cap has been removed.

My invention has to do also with an apparatus by which my process above briefly described may be carried out. An embodiment of such an apparatus is shown in the accompanying drawings in which—

Figure 4:
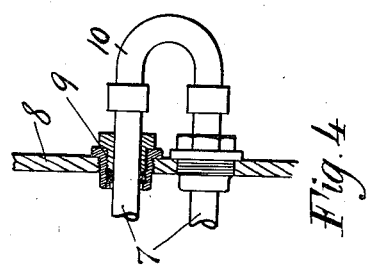
Figure 5:
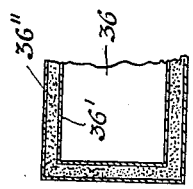
Figure 3:
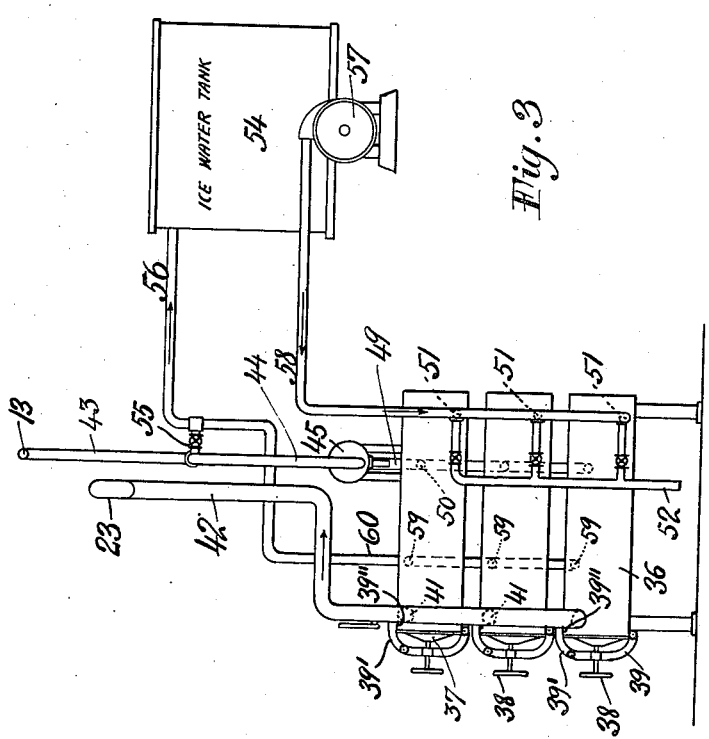

Figure 1 shows in elevation a portion of the apparatus, Fig. 2 shows in elevation the remaining portion of the apparatus a part of which is shown by Fig. 1, Fig. 3 is an end elevation of that portion of the apparatus which is shown by Fig. 2, Fig. 4 is a detail of the milk heater and Fig. 5 is a detail of the pasteurizing and cooling tanks.

The advantages of the apparatus of my invention and further advantages of my process will be pointed out or will otherwise appear in the following description of the construction and operation of the apparatus shown in the drawings.

The milk is first introduced into the centrifugal machine 1 which may be of ordinary construction although I prefer a machine in which the strainer is composed of "terry" cloth. From the centrifugal machine the milk is discharged into the dumping vat 2 from which it is pumped by the milk pump 3 into the coils of the milk heater 4, after traversing which it emerges through the pipe 5 fitted with a weighted valve 6. The coils of the milk heater comprise pipes 7 which extend horizontally through the cylindrically shaped heater and project beyond the heads 8 thereof. Where the pipes 7 pass through the heads they are each provided with a stuffing box 9. The pipes are connected in series by means of U-shaped connectors 10 which are secured by suitable means, such as screw threaded unions, to the ends of adjacent pipes. Upon the removal of the connectors 10, the interiors of the pipes 7 may be easily inspected and cleaned. If necessary the pipes 7 may readily be removed from the heater by merely loosening the stuffing-box followers and drawing the pipes in a longitudinal direction. The pipes 7, as well as all other parts of my apparatus which is adapted to come into contact with the milk, are preferably provided with tin or silver linings. Horizontal partitions 11, of which there may be any desired number, extend across the heater between the pipes 7, being riveted at their sides to the cylindrical casing of the heater. These partitions serve to divide the heater, externally of the milk coils 7, into a plurality of chambers which are in communication with each other alternately at the heads of the casing by reason of the fact that the partitions are shorter than the casing and are so disposed as to alternately leave a communicating space 12 between their ends and the heads 8.

The water for heating purposes may be conducted from the ordinary city water supply pipe 13 into the expansion tank 14, in which a predetermined level may be maintained by the float-operated valve 15. From the expansion tank the water discharges into the pipe 16 from which it is drawn by the pump 17 and forced through the hot water heater 18. This heater may be of any suitable construction and preferably comprises a coil through which the water to be heated passes and about which steam is admitted. As shown, steam is introduced into the heater 18 through the steam pipe 19, the amount of steam being regulated by the thermostatic device 20 by the operation of which the heating of the water to a certain predetermined temperature, say 145° F. is accomplished. The water after being heated is forced through the pipes 21 and 22 into the lower part of the milk heater 4 through the chambers of which it flows in series being directed continually from one end of the heater to the other by the partitions 11. After thus flowing back and forth in the heater chambers, during which time its heat is communicated to the milk in the milk pipes 7, the water is conducted through the return pipe 23 to the inlet pipe 16, in this way forming a continuous circuit. The milk thus heated to a temperature of 145° F. is forced through the pipe 5 under a pressure which is sufficient to overcome the resistance of the weighted valve 6 and enters the milk filter 24. Because of the pressure maintained in the coils, the heating is accomplished more quickly and uniformly and, all parts of the coil being completely filled with milk, the coil does not become more highly heated at one point than at another, a condition which would result in the baking or crusting of the milk within the coil. The pipe 5 may, if desired, be provided with thermometers 25 and 25'. The filter 24 which may be of any suitable construction, carries a filter bed of non-absorbent particles, such as ground quartz, of such size and in a bed of such thickness that when the hot milk is forced through it all of the dirt and a considerable percentage of bacteria will be removed. The butter-fat, however, will pass through with the other constituents of the milk, the filtered liquid being forced through the pipe 26 into the covered milk receiving tank 27.

A part of the water heated in the heater 18 is conducted through the pipe 28 connected with the heater outlet pipe 21 and the pipe 29 connected with the pipe 28 to the water jacket with which the filter 24 is provided. After traversing the water-jacket it is conducted to the return pipe 23 by means of the pipe 30. The pipe 31 also connected with the pipe 28 conducts a further portion of the water heated by the heater 18 to the water jacket of the milk receiving tank 27, after traversing which it is conducted through the pipe 32 to the return pipe 23. In this way the temperature which the milk attained in the heater 4 is maintained while it is in the filter and the receiving tank.

From the receiving tank the hot milk is forced through the pipe 33 and discharged into the covered tank of the bottle filling and capping apparatus 34. This apparatus may be of any suitable construction and is preferably an apparatus which is capable of filling a plurality of bottles, as a crate full, simultaneously and then capping the filled bottles at a single operation. The empty bottles are sterilized, heated to the temperature of the milk with which they are to be filled and placed in trays or crates 35 before being placed under the filling nipples of the apparatus 34. The sterilizing may be done by washing the bottles in an alkali solution at 140° F., then rinsing with water at 170° F. to 190° F. and then allowing them to dry and cool to the milk temperature, 145° F. When filled, the bottles are at once capped by the apparatus. The caps which I prefer to use are the fluid-tight crown caps of commerce, the under side of which are provided with a thin lining of cork or of paraffin, so that the milk will at no time be exposed to the metal of which the caps are composed. When the crate full of bottles has been capped, they are placed, crate and all, and before the temperature has fallen appreciably below 145° F. into a compartment of the sterilizing apparatus. This apparatus comprises a plurality of compartments 36, three of which are shown, in the form of tiers, one above the other. Each compartment is in the form of an elongated box, capable of accommodating a number of crates, the latter being introduced into the compartment through one or more openings in the front thereof. When a compartment has been filled with crates of filled and capped bottles, these openings are closed by closures 37 which are pressed firmly against the front of the compartment bordering the openings therein by hand screws 38 coöperating in an obvious manner with suitable yokes 39. The latter may be hinged at the bottom to the compartments and may each be provided with a hooked extension 39' pivotally connected with the yoke and provided with a hook or projection 39" which coöperates with a recess in the upper external wall of the compartment. It is obvious that upon loosening the screw 38, the hooked extension 39' may be disengaged from the compartment and the yoke 39 may then be swung down on its hinge. In this way the openings may obviously be freed of their closures 37 or may be sealed by them to form a fluid-tight closed compartment. The closure at the left of the upper compartment is shown in Fig. 2 in open position, the other closures being shown in closed position.

The walls of the compartments are preferably formed of sheet metal and provided with non-corrodible sheet metal linings 36', between which and the outer wall a filling of asbestos or other heat insulating material 36" is placed. Each compartment is further insulated from the adjacent compartments by constructing the tiers with intermediate air spaces.

When a compartment of the pasteurizing apparatus has been completely filled with crates containing filled and capped bottles of milk at approximately 145° F., the closures 37 are forced into position to close the openings on the front wall of said compartment, and water at 145° F. is admitted through a valved pipe 40 which connects one end of each compartment with pipe 28, leading from the water heater 18. The water at such temperature is caused to flood the compartment so that it comes into contact with the whole external surface, including the cap of each bottle, and after passing through the compartment it passes through a valved pipe 41 and the pipe 42 into the return pipe 23, the flow being continued for the prescribed time for accomplishing pasteurization. After the pasteurization is complete, water at 100° F., then water at ordinary temperature and finally water at a refrigerating temperature is caused to flow through the compartment.

The water at 100° F. is obtained by conducting supply water from the pipe 13 through pipes 43 and 44 to the auxiliary heater 45 in which it is heated by steam admitted through the pipe 46. The temperature of the water in the outlet pipe 47 is regulated by the thermostatic device 48 connected with the steam pipe 46. From the pipe 47, the hot water is conducted through pipe 49 and one of the valved branch pipes 50 into the desired compartment, after flowing through which it issues from a pipe 51 and is discharged from the drain pipe 52. The water at ordinary temperature is conducted from the pipe 43 directly to the pipe 49 through the valved connecting pipe 53, the heater 45 being rendered inactive by closing the valve in the outlet pipe 47 and that in the steam pipe 46. The refrigerating water is obtained from a refrigerating apparatus, as the ice water tank 54, to which supply water may be conducted from pipe 44 through the valved pipe 55 and the tank inlet pipe 56. The refrigerating water is drawn from the tank 54 by a pump 57 and forced through the pipe 58 and the valved pipes 51 which previously served as outlets for each compartment for water at 100° F. and at ordinary temperatures. The refrigerating water after traversing the desired compartment issues through valved pipes 59 which are connected by pipe 60 with the tank inlet pipe 56. The refrigerating water is thus caused to flow in a continuous circuit which may include any one or more of the pasteurizing compartments by the obvious manipulation of the valves in the inlet and outlet pipes.

In utilizing the pasteurizing apparatus, I preferably fill one compartment with crates containing filled and capped bottles of milk at a pasteurizing temperature. The closure is sealed in place and water from the pipe 28 which has been heated to about 145° F. by the heater 18 is caused to flood the compartment, submerging the bottles therein, by opening the valves in the pipes 40 and 41. It will be seen that substantially no heat will be abstracted from this water by the filled bottles, because the latter are at substantially the same temperature as the water. After thorough pasteurization in this manner, the valves in pipes 40 and 41 connected with the compartment are closed and the valves in pipes 50 and 52 are opened, those in pipes 53 and 51 being closed, so as to allow water at a temperature of about 100° F. supplied by the auxiliary heater to flow through the compartment to cool gradually the bottles and their contents, such cooling insuring obviously a minimum breakage of the bottles. After a few minutes of such flow ordinary supply water is admitted by closing the valve in pipe 47 and opening that in pipe 53 to further cool the bottled milk. Finally the valves on the pipes 50, 52 and 53 are closed and those in pipes 51 and 59 are opened so as to allow refrigerating water to be forced through the compartment by the pump 57. The compartments being equipped with pipes and valves independently of each other, it is evident that water of varying degrees of temperature may be introduced into each compartment independently of the others. For example, while water at 145° F. is traversing one compartment, water at the same temperature or at 100° F. or at ordinary temperature may be caused to traverse any other of the compartments. In cooling the pasteurized milk, it may of course be unnecessary to first supply water at 100° F., but water at ordinary temperatures may be introduced instead. The refrigerating water may be forced through one or more of the compartments for an indefinite time, the compartment acting as a storage chamber. At any time after the milk has been cooled to refrigerating temperature, the compartment may be opened and the crates may be loaded directly on the wagons for delivery. The crates which I prefer to use in my apparatus are the ordinary non-corrodible metallic crates which are commonly used for delivery purposes. The utilization of such crates insures a minimum amount of handling for after the bottles have been placed in them preparatory to filling and capping, the bottles are at no time up to actual delivery to the consumer's door subjected to individual handling.

My apparatus has the important advantage of being easily and thoroughly cleaned as to those parts thereof with which the milk comes into contact. To clean and sterilize these parts I introduce supply water into the dumping vat 2 through the pipe 61 and by its use prepare an alkali cleansing solution which is pumped by the pumps through the milk coils of the heater 4 which is now heated by introducing steam from the pipe 19 through the branch pipe 63. The solution is thus boiled in the tubes and is forced boiling through the filter, holding tank and bottle filling machine, issuing in streams from the nipples of the latter. The filter bed may have been removed prior to the passage of the solution. This solution is followed by boiling water. The temperature of the solution and the water may be raised to 320° F. by the heater. When the water issues in clear streams from the filling nipples, steam may be forced through if desired, the flow of steam being followed by a flow of hot air. The air may be first purified and compressed by the compressor 64 and driven through the pipe 65 into the air storage tank 66, from which it may be admitted to the milk coils of the heater 4 by the pipe 67. The air becomes heated in the heater and following the course of the cleansing fluids issues finally from the filling nipples. The apparatus is thus thoroughly dried and sterilized and the nipples may be closed so as to prevent admission of atmospheric air until the apparatus is to be used again for pasteurizing purposes. After the hot air has traversed the apparatus for a time, I prefer to stop the flow momentarily and insert a new filter bed, or the old one thoroughly cleaned, into the filter. The air is then again admitted so as to sterilize and dry the new filter bed in addition to the other parts of the apparatus.

I claim:—

1. In the process of pasteurizing milk, the improvement which consists in forcing milk heated to substantially a pasteurizing temperature through a filtering medium into a storage chamber and thence into bottles, the temperature to which the milk was first heated being substantially maintained during the filtering, storing and bottling operations.

2. The process of treating milk, which consists in heating the milk, then forcing the heated milk to substantially a pasteurizing temperature through a filtering medium, then filling it into a container, the temperature to which the milk was first heated being substantially maintained during the filtering and filling operations then sealing said container and then subjecting the milk in said container to pasteurizing conditions by flowing in contact with the container for a suitable time, a liquid having a pasteurizing temperature substantially as and for the purpose described.

3. The process of treating milk, which consists in heating the milk, then forcing the heated milk to substantially a pasteurizing temperature through a filtering medium, then filling it into a container, the temperature to which the milk was first heated being substantially maintained during the filtering and filling operations then sealing said container, then subjecting the milk in said container to pasteurizing conditions by flowing in contact with the container for a suitable time, a liquid having a pasteurizing temperature and then cooling said milk by flowing in contact with the container, a liquid having a lower temperature than a pasteurizing temperature, substantially as and for the purposes described.

4. The process of treating milk, which consists in heating it to substantially a pasteurizing temperature, then removing bacteria from it by filtration, and then subjecting the filtered milk to pasteurizing conditions, the milk at all times being kept at a temperature not less than that to which it was first heated.

In testimony whereof, I have hereunto set my hand in the presence of two subscribing witnesses.

JAMES F. LESTER.

Witnesses:
JOHN A. FERGUSON,
FRANK F. KIRKPATRICK.